(12) United States Patent
Irizarry

(10) Patent No.: US 10,095,193 B2
(45) Date of Patent: Oct. 9, 2018

(54) HIGH SPEED, HIGH VOLTAGE (HV) CAPACITOR SYSTEM (HVCS) CONTROL SYSTEMS AND RELATED METHODS FOR HVCS CHARGE/DISCHARGE UPON ACTIVATION/DEACTIVATION OF A HV MAIN POWER SYSTEM (MPS) OR SYSTEM FAULT EVENT INCLUDING A FIRST AND SECOND TIMING SEQUENCE FOR MPS MAIN RELAY(S) AND HVCS RELAY(S) OPERATION

(71) Applicant: The United States of America as represented by the Secretary of the Navy, Washington, DC (US)

(72) Inventor: George L. Irizarry, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 419 days.

(21) Appl. No.: 14/874,892

(22) Filed: Oct. 5, 2015

(65) Prior Publication Data
US 2017/0075319 A1    Mar. 16, 2017

Related U.S. Application Data

(60) Provisional application No. 62/217,472, filed on Sep. 11, 2015.

(51) Int. Cl.
G05B 9/02    (2006.01)

(52) U.S. Cl.
CPC ..................... *G05B 9/02* (2013.01)

(58) Field of Classification Search
CPC .. F16P 3/14; F16P 3/12; H01H 47/002; G05B 9/03; G05B 9/02
USPC ......................................................... 307/326
See application file for complete search history.

(56) References Cited

U.S. PATENT DOCUMENTS

| 4,360,850 A * | 11/1982 | Howard ................. B41F 9/001 361/54 |
| 5,642,035 A * | 6/1997 | Ragsdale ............... C12M 35/02 323/282 |
| 6,631,066 B1 * | 10/2003 | Smith ..................... G05F 1/613 361/103 |
| 2007/0008749 A1 * | 1/2007 | Baurle .................... H02M 1/32 363/21.12 |

* cited by examiner

*Primary Examiner* — Thienvu Tran
*Assistant Examiner* — Brian K Baxter
(74) *Attorney, Agent, or Firm* — Christopher A. Monsey

(57) ABSTRACT

Exemplary apparatuses and methods are provided which provide a safety system that automatically controls charge and discharge of high voltage (HV) capacitors upon application or removal of HV power to a HV system (e.g., a surveillance radar) that includes different timing and sequencing for turn-on/turn operations. In one embodiment, an apparatus and method automatically discharges high voltage (HV) capacitors when HV power is deactivated. Another aspect of an embodiment of the invention automatically deactivates a HV capacitor shunt when the HV system's main HV power is applied or activated. Additionally, an exemplary apparatus requires no human interaction when shunting the HV capacitors, increasing electrical system safety.

11 Claims, 14 Drawing Sheets

| Delay | Minimum (msec) | Maximum (msec) | Comments |
|---|---|---|---|
| $T_1-T_0$ | 0 | 50 | Time delay until Crowbar shunt is removed after AC Mains is commanded to ON. |
| $T_2-T_0$ | 75 | 150 | Time delay until AC Mains is switched ON after AC Mains is commanded to ON. |
| $T_4-T_3$ | 0 | 75 | Time delay until AC Mains is switched OFF after AC Mains is commanded to OFF. |
| $T_5-T_3$ | 125 | 200 | Time delay until Crowbar shunt is engaged after AC Mains is commanded to OFF. |

Fig. 9

| External Connector 121 to MCCC 2 | | Turrets (Ex): | |
|---|---|---|---|
| Pin: | Function: | Connections to MCCC: | Comment: |
| A | Not Used | - | |
| B | Not Used | - | |
| C | Chassis Ground | E9, Chassis | |
| D | Not Used | - | |
| E | Not Used | - | |
| F | Not Used | - | |
| G | Not Used | - | |
| H | Chassis Ground | E9, Chassis | |
| J | Active High to Activate HV Relays 31, 33, 35, 37 | E3 75 | Input Control Signal |
| K | Delayed Active High to Close Main Power Relays 41 | E4 77 | Delayed Output Control Signal |
| L | MCCC Power Supply 45 Input | E1 71 | Input Power |
| I | MCCC Power Supply 45 Input Return | E2 73 | Input Power Return |

Fig. 12

| J | Pin | Function | Internal Connection to: | Comment |
|---|---|---|---|---|
| J1 | 1 | +28Vdc Supply Power | Relay K1, X1 turret terminal | +28Vdc Power |
| J1 | 2 | +28Vdc Supply Power Return | Relay K1, X2 turret terminal | Return |
| J2 | 1 | +28Vdc Supply Power | Relay K2, X1 turret terminal | +28Vdc Power |
| J2 | 2 | +28Vdc Supply Power Return | Relay K2, X2 turret terminal | Return |
| J3 | 1 | +28Vdc Supply Power | Relay K3, X1 turret terminal | +28Vdc Power |
| J3 | 2 | +28Vdc Supply Power Return | Relay K3, X2 turret terminal | Return |
| J4 | 1 | +28Vdc Supply Power | Relay K4, X1 turret terminal | +28Vdc Power |
| J4 | 2 | +28Vdc Supply Power Return | Relay K4, X2 turret terminal | Return |

Fig. 13

HIGH SPEED, HIGH VOLTAGE (HV) CAPACITOR SYSTEM (HVCS) CONTROL SYSTEMS AND RELATED METHODS FOR HVCS CHARGE/DISCHARGE UPON ACTIVATION/DEACTIVATION OF A HV MAIN POWER SYSTEM (MPS) OR SYSTEM FAULT EVENT INCLUDING A FIRST AND SECOND TIMING SEQUENCE FOR MPS MAIN RELAY(S) AND HVCS RELAY(S) OPERATION

CROSS-REFERENCE TO RELATED APPLICATIONS

The present application claims priority to U.S. Provisional Patent Application Ser. No. 62/217,472, filed Sep. 11, 2015, entitled "MECHANICAL CROWBAR CONTROL CIRCUIT BOARD," the disclosure of which is expressly incorporated by reference herein.

STATEMENT REGARDING FEDERALLY SPONSORED RESEARCH OR DEVELOPMENT

The invention described herein may be manufactured, used and licensed by or for the United States Government for any governmental purpose without payment of any royalties thereon. This invention (Navy Case 200,284) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

This invention is directed towards safety systems associated with high power systems. In particular, embodiments of the invention enhance an operators' safety (e.g., avert electrical shock from exposure to high voltage (HV)) and improve reliability of a high power system, e.g., a radar system, by reducing a time period during which components will be subject to fault conditions. In one embodiment, a design can be configured for turning off a main alternating current (AC) power much quicker than existing electrical crowbar assemblies installed in high power systems, e.g., an air surveillance radar system.

In particular, one embodiment can include a mechanical crowbar control circuit (MCCC) that interfaces with a high power system such as an air surveillance radar system. An exemplary MCCC can be configured to safely discharge very HV capacitors stored within cross-field amplifier (CFA) and traveling-wave tube (TWT) cabinets of an exemplary high power system, e.g., radar system, either when the system is turned off either by an operator or by activation of internal fault protection circuits.

An exemplary MCCC can include a timing scheme which governs a turn-on and turn-off sequencing of the MCCC's crowbar shunt (e.g., HV relays that are in a closed position during a system (e.g. radar) power off configuration, causing the discharge of HV capacitors contained within the system) present on the main HV circuits relative to the operation of HV main power system relays that provide power directly to HV transformers and HV rectifiers. In some embodiments, one objective or goal of this turn-on/turn-off sequencing circuit is to preserve HV transformer service life by preventing application of high power to a shunted HV circuit and most importantly to ensure operator safety.

Exemplary apparatuses and methods are provided which provide a safety system that automatically controls charge and discharge of high voltage (HV) capacitors upon application or removal of HV power to a HV system (e.g., a surveillance radar) that includes different timing and sequencing for turn-on/turn operations. In one embodiment, an apparatus and method automatically discharges high voltage (HV) capacitors when HV power is deactivated. Another aspect of an embodiment of the invention automatically deactivates a HV capacitor shunt when the HV system's main HV power is applied or activated.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 9 shows a table explaining the timing sequence shown in FIG. 8;

FIG. 12 shows a table detailing pin assignments of an external connector for an exemplary MCCC in accordance with one embodiment of the invention; and FIG. 13 shows a table explaining showing HV relays connections to/from the MCCC in accordance with one embodiment of the invention.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
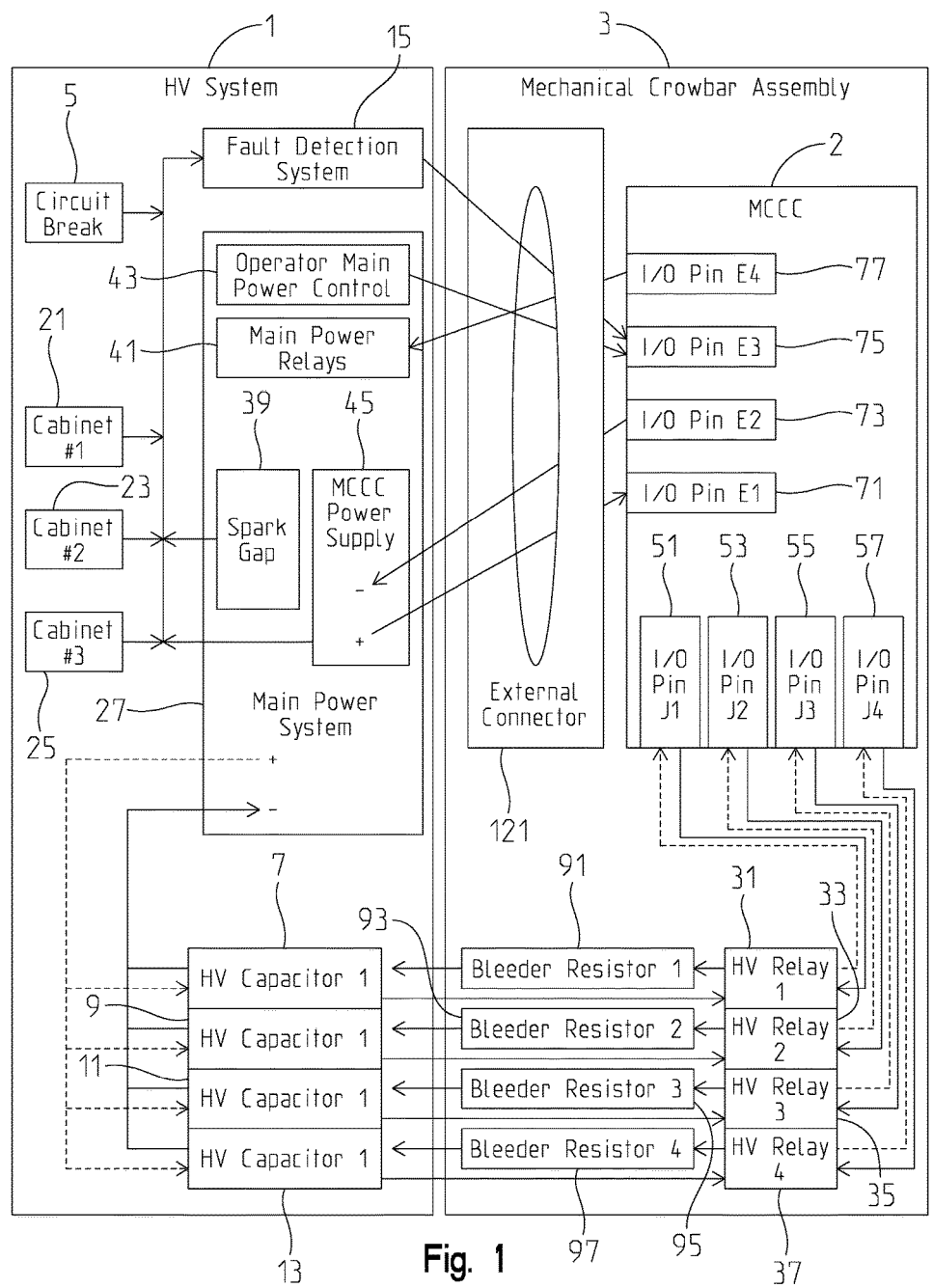
FIG. 1 shows a drawing of how an exemplary high power system, e.g., a radar system, and a MCCC in accordance with an embodiment of the invention interact.

Referring initially to FIG. 1, an exemplary MCCC 2 intercepts signals controlling operation of a HV system (e.g., a radar system) 1 main power supply (MPS) 27 in order to extend the HV system's 1 service life and to protect the system's operator. During operation, the MCCC 2 receives at an IO pin (pin E3 75) either an operator main power control 43 originating from a MPS 27 or a fault signal originating from the a fault detection system 15 of the HV system 1.

As a result of the internal circuitry of the MCCC 2 (described below in FIG. 2, FIGS. 6A and 6B, and FIG. 7), the incoming signal received at TO pin E3 75 causes the MCCC 2 to output an on/off signal to a set of main power relays 41 and to apply or remove power to a set of HV relays 31, 33, 35, 37. Depending on the status of the MPS 27, the on/off signal to the main power relays 41 and the application/removal of power to the HV relays 31, 33, 35, 37 can be delayed an amount of time and then sent out to either: (1) power a set of HV Relays 31, 33, 35, 37 and activate the MPS 27; or (2) deactivate the MPS 27 and remove power from the HV relays 31, 33, 35, 37. An exemplary delay timing sequence is explained below and in FIGS. 8 through 12.

The MPS 27 on/off signal that closes/opens the main power relays 41 leaves the MCCC 2 via an IO pin (pin E4 77). The MPS 27 on/off signal is then input into the main power relays 41 and causes the main power relays 41 to close. Closure of the main power relays 41 completes a circuit to activate the MPS 27 and supply power to other elements of the HV system 1.

Power applied to the HV relays 31, 33, 35, 37 leaves the MCCC 2 via four dual-IO pins: J1 51, J2 53, J3 55, and J4 57. Pin J1 51 is connected to a HV relay #1 31. Pin J2 53 is connected to a HV relay #2 33. Pin J3 55 is connected to a HV relay #3 35. Pin J4 57 is connected to a HV relay #4 37. The four HV relays 31, 33, 35, 37 are switches that are closed when there is no application of power to the HV relays 31, 33, 35, 37.

When closed, each of the HV relays 31, 33, 35, 37 completes a circuit with a respective HV capacitor 7, 9, 11, 13 via respective HV wires and bleeder resistors 91, 93, 95, 97. HV relay #1 31 and HV capacitor #1 7 are in series with a bleeder resistor #1 91. HV relay #2 33 and HV capacitor #2 9 are in series with a bleeder resistor #2 93. HV relay #3 35 and HV capacitor #3 11 are in series with a bleeder resistor #3 95. HV relay #4 37 and HV capacitor #4 13 are in series with a bleeder resistor #4 97. When the HV relays 31, 33, 35, 37 are open, the HV capacitors 7, 9, 11, 13 are no longer shunted, and can therefore safely receive and accumulate power.

At this point, the HV system 1, e.g., radar system, is operating and the MCCC 2 is waiting for a MPS power-off signal from either the fault detection system 15 or from the operator main power control 43. If the MCCC 2 receives the MPS power-off signal from either the fault detection system 15 or from the operator main power control 43, via pin E3 75, the MCCC 2 sends power-off signal, via pin E4 77, to the main power relays 41. This power-off signal commands the main power relays 41 to open, and thus shuts off the MPS 27. The MCCC 2 then stops applying power to the HV relays 31, 33, 35, 37, causing the HV relays 31, 33, 35, 37 to close and to shunt the four HV capacitors 7, 9, 11, 13.

An exemplary MCCC 2 can be powered via a 28V DC power supply (MCCC power supply) 45 that can originate from or be part of the MPS 27. The MCCC 2 can receive power input via two IO pins: pin E1 71 that is connected to a positive terminal of the MCCC power supply 45; and pin E2 73 that is connected to a negative terminal of the MCCC power supply 45 and is treated as a ground for the MCCC 2.

An exemplary shut-off sequence can be triggered by either operator main power control 43 or by the fault detection system 15. The fault detection system 15 can be triggered when certain unsafe operating conditions occur. A first such unsafe condition can include opening of a cabinet 21, 23, 25 of the HV System 1, which contains HV equipment, while the MPS 27 is active. These cabinets 21, 23, 25 contain door switches that will trigger the fault detection system 15 if opened. A second such unsafe condition can occur when a circuit breaker 5 of the HV system 1 is tripped. A third such unsafe condition can occur when a voltage of the MPS 27 is great enough such that electrons jump a spark gap 39 contained within the power supply 27. A fourth such unsafe condition can occur when the MCCC power supply 45 malfunctions. If any of these conditions occur, the fault detection system 15 can send a power-off signal to pin E3 75. This power-off signal causes the MCCC 2 to send out signals to open the main power relays 41 and to close the four HV relays 31, 33, 35, 37.

Figure 2:
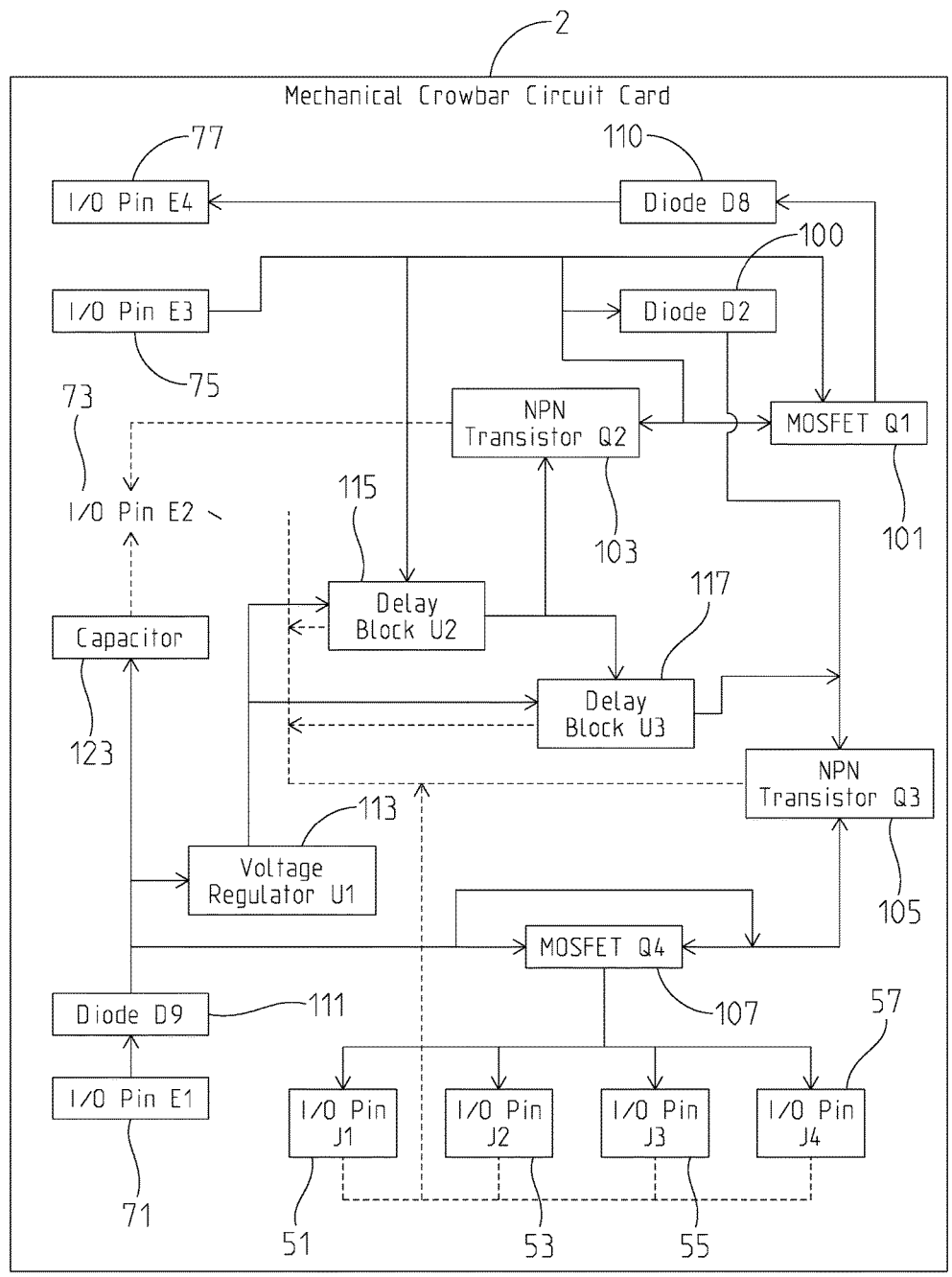
FIG. 2 shows a drawing of an exemplary MCCC and direction signals travel.

FIG. 2 shows a simplified drawing of a MCCC 2 in accordance with one embodiment of the invention. FIG. 2 figure shows IO pins, direction of signals and electricity coming in and going out of the MCCC 2, and the components on the MCCC 2 that perform delay functions. The MCCC power supply 45 (not shown in FIG. 2) is connected to the MCCC 2 via IO pin E1 71. Incoming power can then be directed through a diode D9 111 to prevent a reverse application of power to the MCCC 2 if the MCCC power supply 45 is improperly connected to the MCCC 2 and to protect the MCCC power supply 45 in case it malfunctions. After leaving D9 111, the MCCC power signal path can then be split into multiple MCCC power signal paths. A first MCCC power signal path supplies power to a capacitor C1 123 that can store sufficient energy so that the MCCC 2 can properly shut off the MPS 27 and shunt the HV capacitors 7, 9, 11, 13 if the MCCC power supply 45 were to malfunction. A second MCC power signal path passes incoming power to programmable delay blocks U2 115 and U3 117. Finally, incoming MCC power signals can also be passed to a MOSFET Q4 107. Power cannot pass through Q4 107 until a NPN transistor Q3 105 receives a signal from an operator main power control 43, discussed below.

In one embodiment, the MCCC 2 receives the operator main power control 43 power-on signal via IO pin E3 75. When commanding the MPS 27 to activate, the operator main power control 43 sends a power on-signal as an active high signal to the IO pin E3 75. This power-on signal can be split and directed in multiple control signal paths. The first control signal path feeds the power-on signal through a diode D2 100 and then directly into a NPN transistor Q3 105. Q3 105 acts as a switch for Q4 107. When Q3 105 receives the power-on signal, Q3 105 causes a first gate of MOSFET Q4 107 to close. Closure of the first gate of the MOSFET Q4 107 allows power from the MCCC power supply 45, which is entering the MCCC via E1 71 as discussed above, to continue on through Q4 107 to J1 51, J2 53, J3 55, and J4 57 and then to the four HV relays 31, 33, 35, 37 (not shown in FIG. 2). A time between the MCCC 2 receiving the operator main power control 43 power-on signal to a time the HV relays 31, 33, 35, 37 receive power input signal from J1 51, J2 53, J3 55, and J4 57 can be set or configured at 10 ms or less.

A second control signal path that the operator main power control 43 power-on signal may follow is towards a MOSFET Q1 101. Prior to receiving the operator main power control 43 power-on signal, Q1 101 has an open gate and therefore cannot pass on the incoming power-on signal from the operator main power control 43. The incoming power-on signal from the operator main power control 43 will remain at Q1 101 until Q1's 101 gate is closed.

A third control signal path the operator main power control 43 power-on signal may follow is to the delay block U2 115. After being delayed a predetermined amount of time, the operator main power control 43 power-on signal continues on towards the NPN transistor Q2 103 and the second delay block U3 117.

The NPN transistor Q2 103 operates as a switch for the Q1 101. Once the NPN transistor Q2 103 receives the operator main power control 43 power-on signal Q1's 101 gate will close, allowing the operator main power control 43 power-on signal previously held at Q1 101 to pass to an IO pin (pin E4 77). The operator main power control 43 power-on signal then is passed out of the MCCC 2 via IO pin E4 77 and causes the main power relays 41 of the HV system 1 to close. Closure of the main power relays 41 activates the MPS 27, supplying power to other elements of the HV system 1.

At this point, the MCCC 2 will wait for either a fault signal from the fault detection system 15 or a power-off signal from the operator main power control 43 via IO pin E3 75.

When a fault occurs generating the power-off signal from the fault detection system 15 or the operator sends the power-off signal from the operator main power control 43, the power-off signal is input into IO pin E3 75, e.g., IO pin E3 75 goes low. The power-off signal (e.g., IP pin E3 75 goes low) is passed into and through Q1 101 and E4 77 causing both Q1 101 and E4 77 to go low, thus sending the power-off signal as an output signal to the main power relays 41 (e.g., the power-off signal input to the main power relays 41 goes to low). Receipt of the power-off signal by the main power relays 41 opens the main power relays 41, deactivates the MPS 27, and power from the HV system 1. An exemplary power-off sequence or process (e.g. such as described herein), from E3 75 receiving the fault/power-off signal to the main power relays 41 receiving the power-off/open signal, can be set or configured to take 10 ms or less.

Additionally, when the power-off input signal passing into IO pin E3 75 goes low, the power-off signal input into Q3 105 and the power-off signal input into U2 115 both go low. However, signal input into Q3 105 will remain high for a predetermined amount of time (delay), e.g., 125-160 ms, due to a combined delay function of U2 115 and U3 117. This exemplary predetermined amount of time (e.g., delay) can cause Q3 105 to remain closed and the first gate of Q4 107 to remain closed for the same predetermined amount of time (e.g., delay). As long as the first gate of Q4 107 remains open, Q4 107 will pass on power to the HV relays 31, 33, 35, 37, via J1 51, J2 53, J3 55, and J4 57, for the same predetermined amount of time (e.g., delay) after the MCCC 2 receives the power-off signal from either fault detection system 15 or operator main power control 43 to deactivate the MPS 27. An exemplary purpose of this predetermined amount of time (e.g., delay) can be to prevent the HV relays 31, 33, 35, 37 from closing prematurely and discharging the HV capacitors 7, 9, 11, 13 while the MPS 27 is still active and supplying power to the HV capacitors 7, 9, 11, 13.

In one exemplary design, diode D2 100 prevents delayed power-off high signal from leaving U3 117 toward Q3 105 from being passed backwards and sending an unwanted high signal to other components of the MCCC 2. If, for example, Q1 were to receive this unwanted high signal, it is possible that the MPS 27 would remain active when the HV capacitors 7, 9, 11, 13 are shunted and could potentially harm the HV system 1 or the operator.

In one embodiment, components of the HV system 1 that are connected to IO pins E1 71, E2 73, E3 75, E4 77 (e.g. fault detection system 15, operator main power control 43, main power relays 41, and the MCCC power supply 45) are respectively connected to IO pins E1 71, E2 73, E3 75, E4 77 via an external connector 121.

Figure 3:
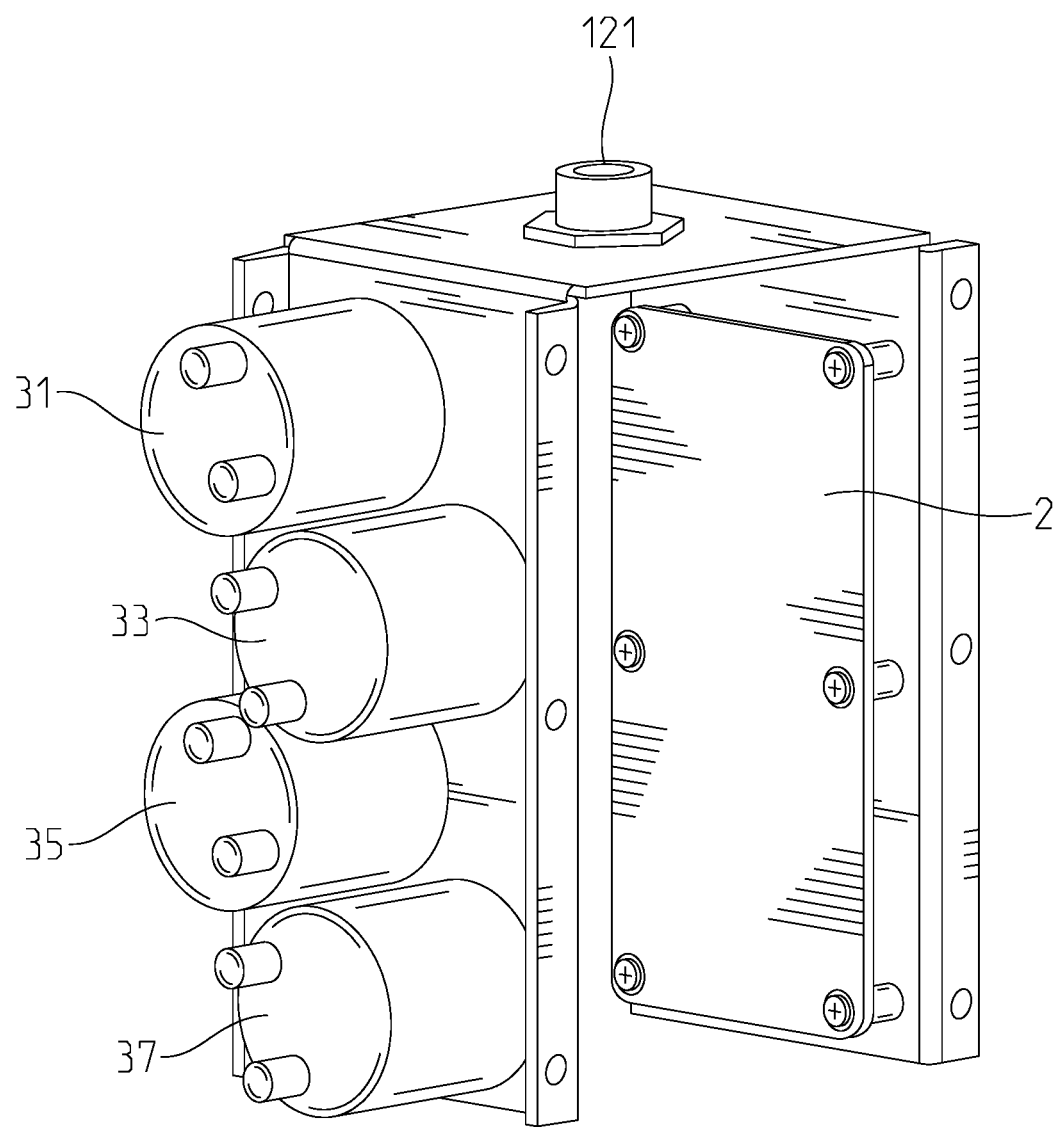
FIG. 3 shows a simplified drawing of an interface of a MCCC, a high power system (e.g., radar system), and HV relays in accordance with one embodiment of the invention.

FIG. 3 shows an exemplary connection of a MCCC 2 to a set of HV relays 31, 33, 35, 37, as well as how the MCCC 2 may connect to the external connector 121.

Figure 4:
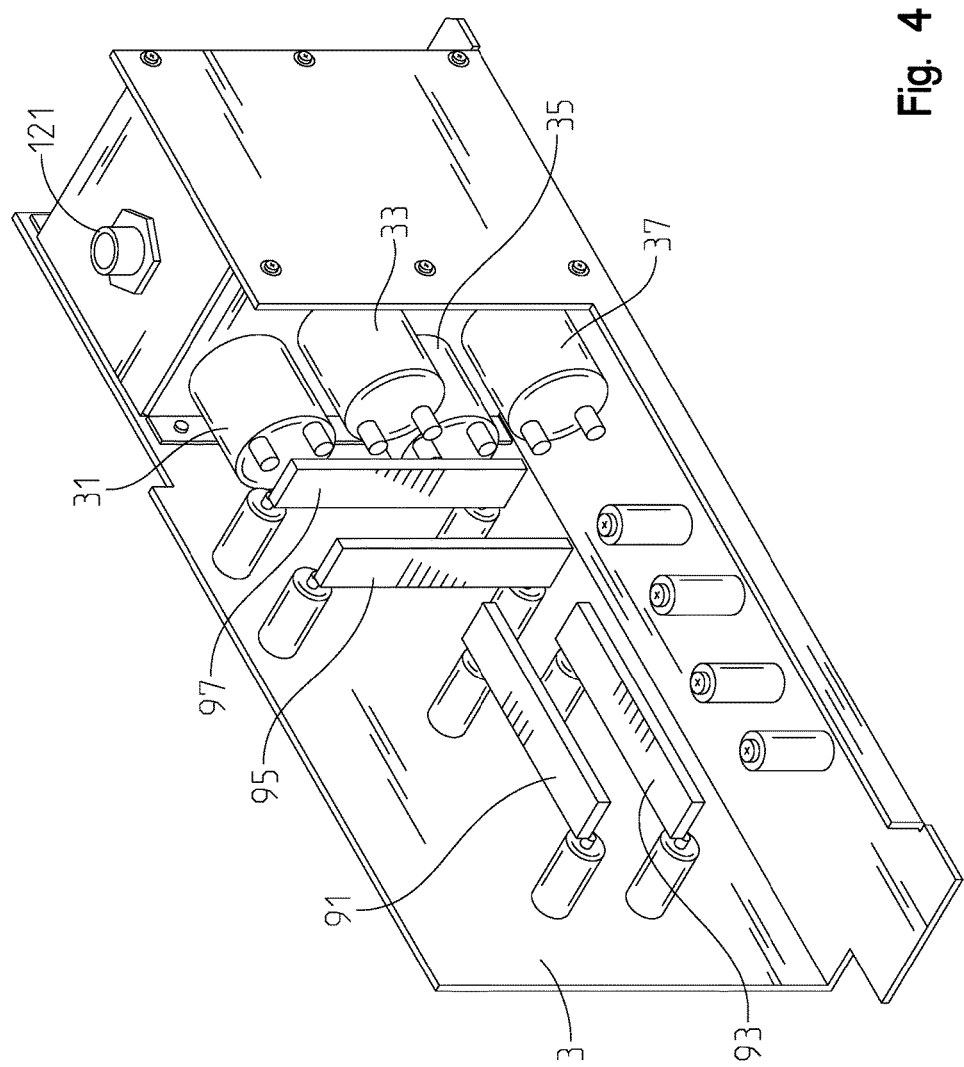
FIG. 4 shows a simplified drawing of a mechanical crowbar assembly, including a MCCC, in accordance with one embodiment of the invention.

FIG. 4 shows an exemplary mechanical crowbar assembly 3, in accordance with one embodiment of the invention. In addition to showing a possible external connector 121 configuration, FIG. 4 also shows one example of how a set of HV relays 31, 33, 35, 37, and a set of bleeder resistors 91, 93, 95, 97 may be organized within the exemplary mechanical crowbar assembly 3.

Figure 5:
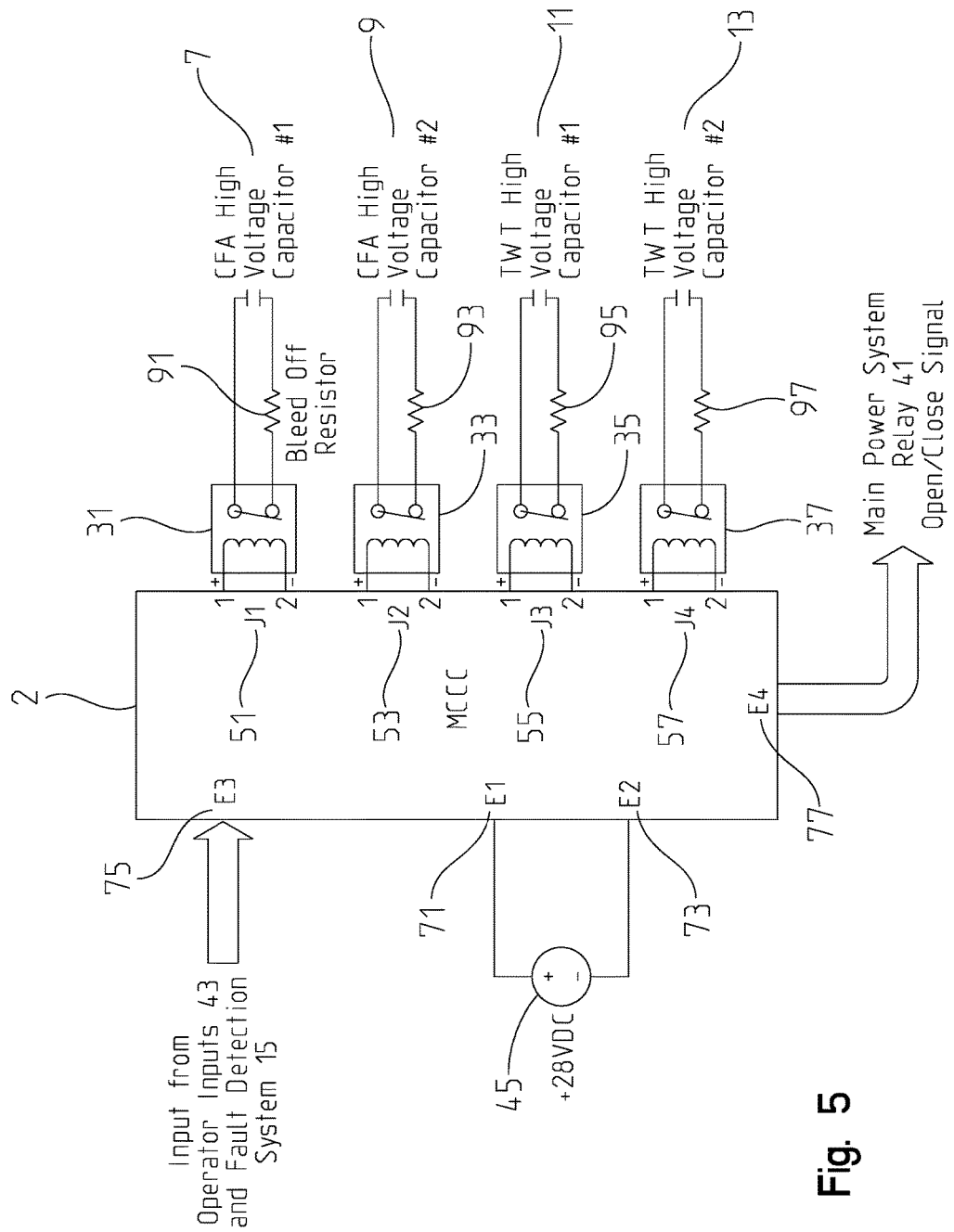
FIG. 5 shows a basic MCCC system interface diagram including inputs and outputs entering and leaving the MCCC in accordance with one embodiment of the invention.

FIG. 5 shows one example of how a signal from the operator main power control 43 or from the fault detection system 15 could enter the MCCC 3 via an IO pin E3 75, how a power supply 45 may be connected to the MCCC 2 via a set of IO pins E1 71 and E2 73, and MCCC 2 IO pins E4 77, J1 51, J2 53, J3 55, or J4 57 are used to respectively interface with HV relays 31, 33, 35, and 37. FIG. 5 also shows an example of how individual IO pins J1 through J4 (51, 53, 55, 57) can be separately connected to a respective HV relay 31, 33, 35, 37, a respective bleeder resistor 91 93, 95, 97, and a respective HV capacitor 7, 9, 11, 13.

Figure 6A:
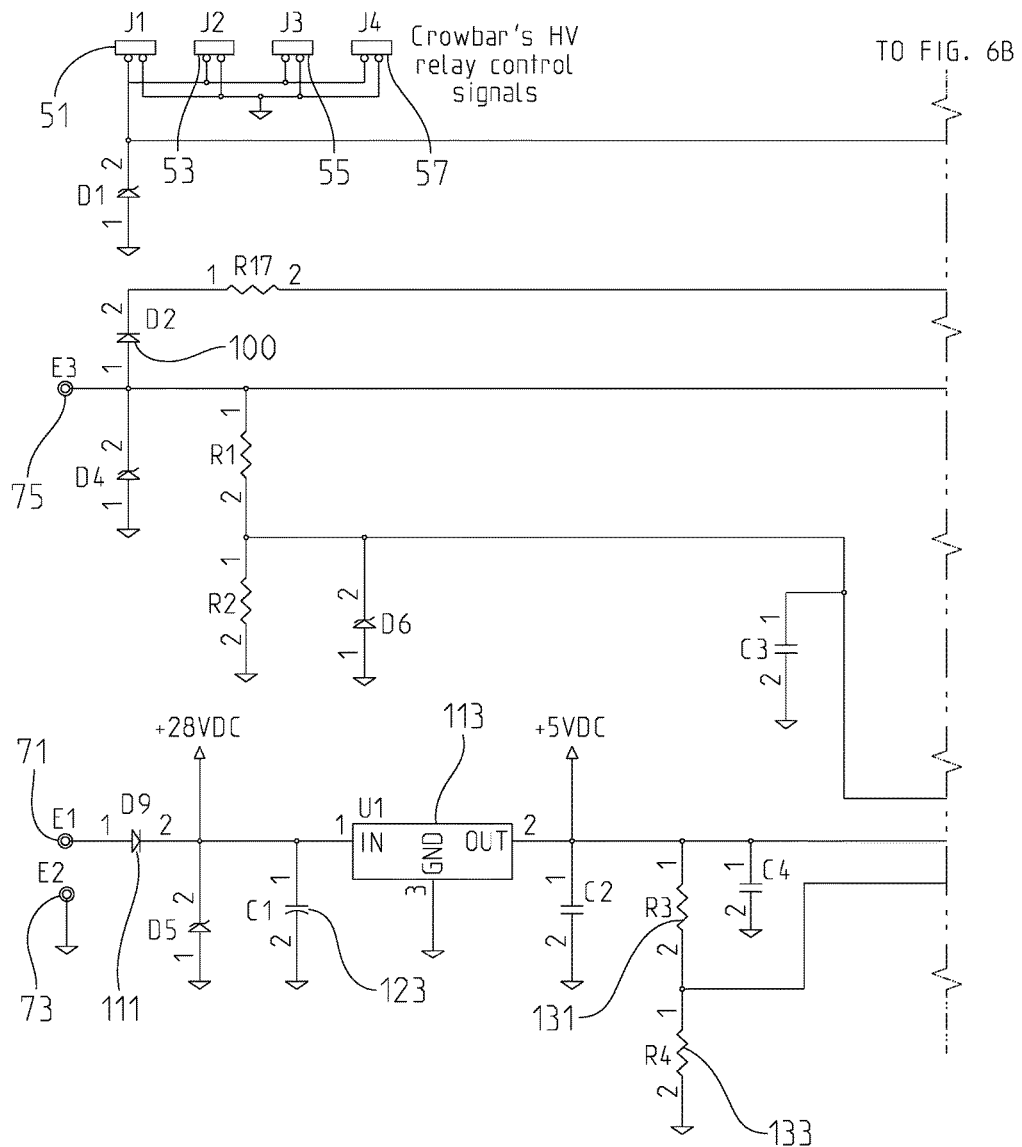
FIGS. 6A and 6B show a circuit schematic of the MCCC in accordance with one embodiment of the invention.
Figure 6B:
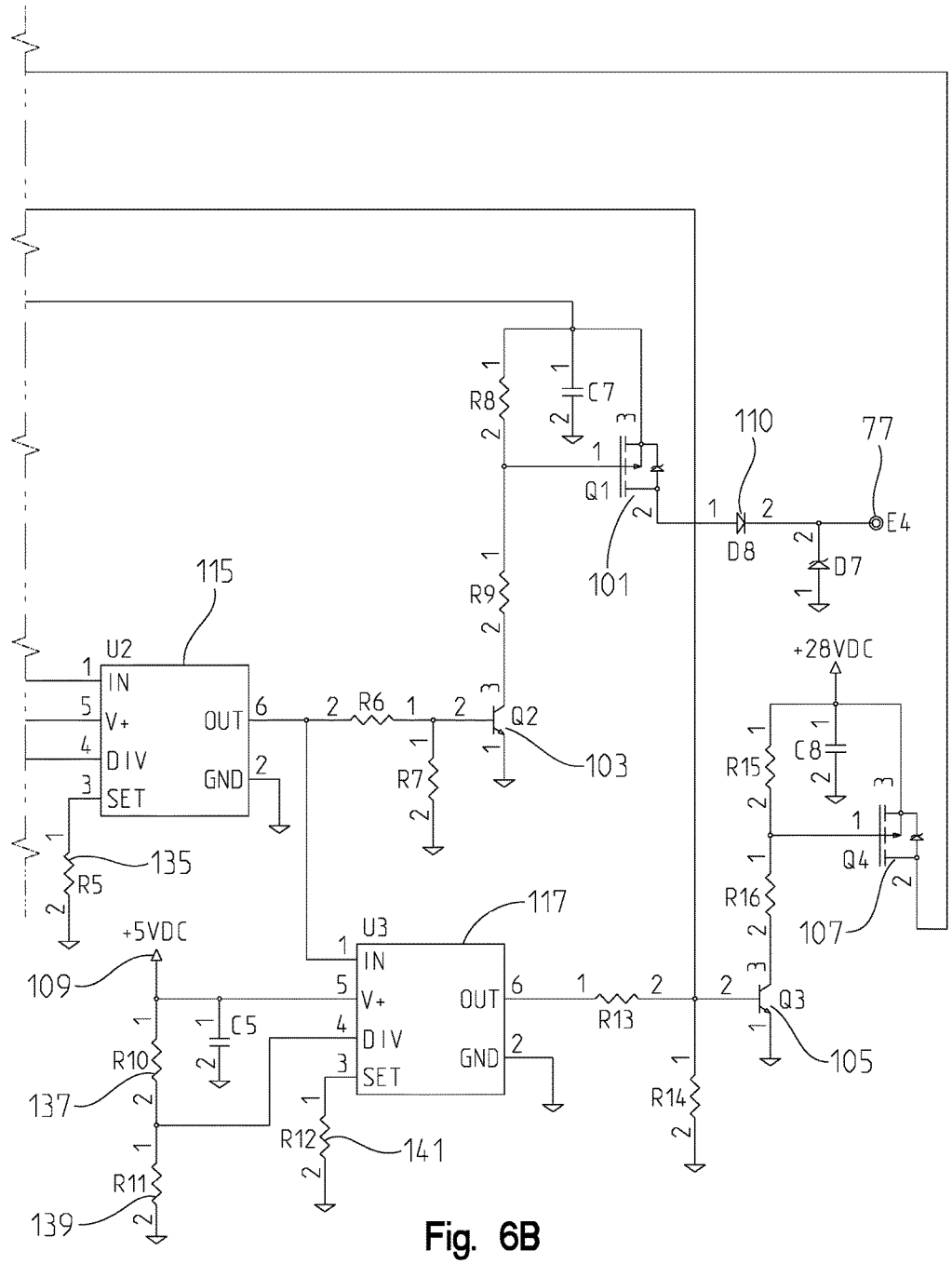

FIGS. 6A and 6B show an exemplary schematic of a MCCC 2. An output signal leaving via IO pin E4 77 depends on two separate signals in order to send an output signal. These two separate signals are inputs received by Q2 103 and Q1 101. If one input signals into either Q2 103 or Q1 101 is low, then the signal leaving E4 77 is low. If both signal inputs received by Q2 103 and Q1 101s are high, then a signal leaving E4 77 is high. During an exemplary turn-on phase, where the MCCC 2 receives a system power-on signal from the operator main power control 43, the power-on signal into Q1 101 can go high within a predetermined amount of time, e.g., 10 ms, and the signal into Q2 103 can go high after a second predetermined amount of time that is longer than the first, e.g., 75-100 ms, due to a delay caused by U2 115. U2 115 and U3 117 can be programmable signal delay blocks, wherein U2 115 can be used in conjunction with a set of resistors (R3 131, R4 133, and R5 135) to delay an incoming signal a desired time period, e.g., from 1 microsecond to 33.6 seconds, depending on resistance of each resistor. Similarly, another set of resistors (R10 137, R11 139, and R12 141) can be used in conjunction with U3 117 to create another delay, e.g., 1 ms to 33.6 s, depending on the resistance of each resistor. The delay caused by U2 155 can delay the signal leaving E4 77 by the same second predetermined amount of time.

In this embodiment, on the other hand, when power-off input passed into the MCCC 2 IO pin E3 75 goes low, the power-off input into Q1 101 goes low instantaneously and causes the power-off signal leaving E4 77 to go low within 10 ms.

In this embodiment, unlike a signal leaving E4 77, which depends on a state of two switches with one input each, a signal leaving via IO pins J1 51, J2 53, J3 55, and J4 57 depends on a state of one switch (Q3 105) that has two inputs. One of these Q3 105 inputs is directly connected to E3 75. The other Q3 105 input is connected to E3 75 via delay blocks U2 115 and U3 117. When either of these two Q3 105 inputs is high, Q3 105 will remain closed, causing Q4 107 to remain closed and thus pass a high signal along to the HV relays 31, 33, 35, 37 via IO pins J1-J4 51, 53, 55, 57.

When the MCCC 2 receives a high input signal (power-on) from the operator main power control 43 (commanding MPS 27 on) via E3 75, Q3 105 quickly closes and causes Q4 107 to close within a third predetermined time period that can be configured or set to be 10 ms or less.

When the input power-off signal, e.g., from operator main power control 43, to the MCCC 2 via E3 75 goes low, the power-off signal traveling through U2 115 and U3 117 will remain high for a fourth predetermined amount of time, e.g., 125-160 ms. This fourth predetermined amount of time (e.g., delay) can cause Q3 105 and Q4 107 to remain closed for the same fourth predetermined amount of time (e.g., delay) after the input power-off into E3 75 goes low. By delaying Q4 107 from opening for the fourth predetermined amount of time (e.g., delay), both the closing of the HV relays 31, 33, 35, 37 and the discharging of the HV capacitors 7, 9, 11, 13 until the MPS 27 is safely deactivated.

Figure 7:
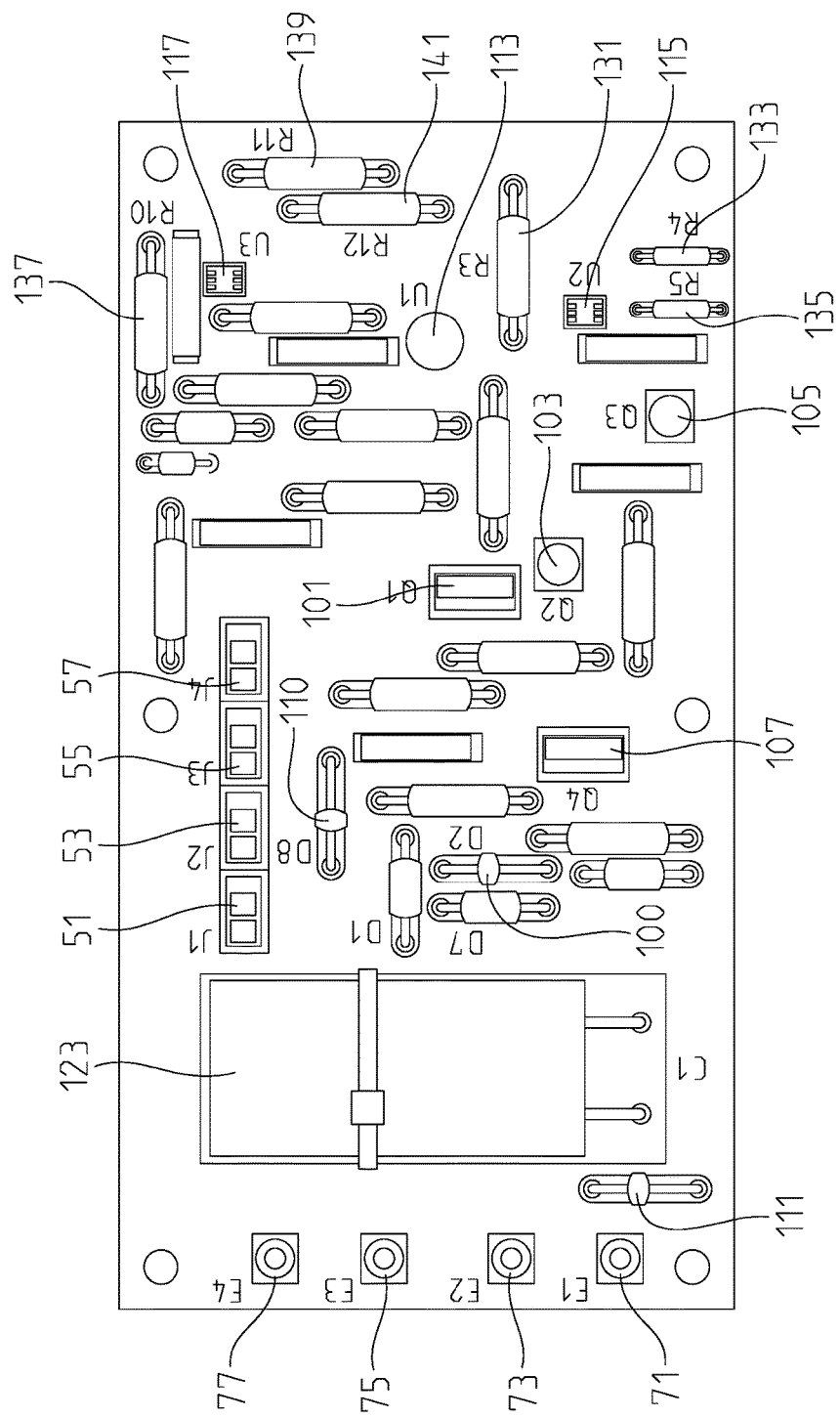
FIG. 7 shows an image of a MCCC printed circuit board in accordance with one embodiment of the invention.

FIG. 7 shows a possible architecture for a MCCC 2 printed circuit board (PCB) in accordance with one embodiment of the invention. The exemplary PCB has a capacitor C1 123 that is very large. The capacitor 123 is selected to store sufficient energy to power the MCCC 2 for a short period of time in case the MCCC power supply 45 malfunctions.

Figure 8:
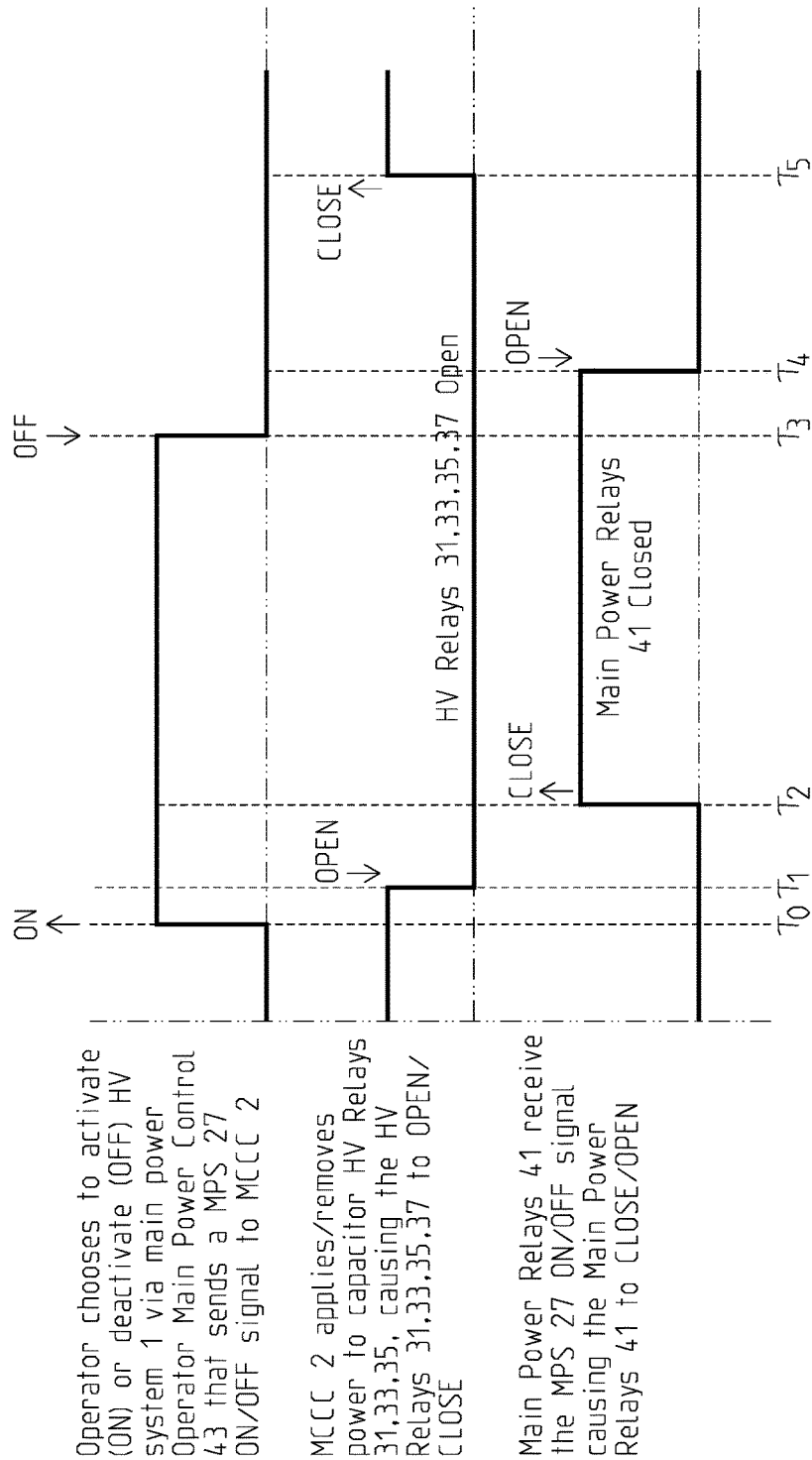
FIG. 8 shows a timing sequence of a shunting process in accordance with one embodiment of the invention.

FIG. 8 shows one exemplary timing sequence of the HV relays 31, 33, 35, 37 and the main power relays 41 as dependent upon the operator main power control 43 and the fault detection system 15. When the power-on input into E3 75 goes high ($\tau_0$) (due to the operator choosing to activate the operator main power control 43), the HV relays 31, 33, 35, 37 should open within a time period $\tau_1$-$\tau_0$ and the main power relays 41 should close (thus activating the MPS 27) after a time period $\tau_2$-$\tau_0$. When the input into E3 77 goes low ($\tau_3$) (due to the operator selecting deactivation of the MPS 27 operator main power control 45 or due to a fault being detected by the fault detection system 15), the main power relays 41 should open within a time period $\tau_4$-$\tau_3$ and the HV relays 31, 33, 35, 37 should close after a time period $\tau_5$-$\tau_3$.

FIG. 9 provides exemplary times for the variables $\tau_0$ through $\tau_5$ as presented in FIG. 8. In order to protect the operator and extend the life of the HV system 1, it is desirable for the opening and closing of the main power relays 41 and the HV relays 31, 33, 35, 37 to occur as quickly as possible without the potential for the HV relays 31, 33, 35, 37 to be closed while the main power relays 41 are closed. This closure can prevent the HV capacitors 7, 9, 11, 13 from discharging while the MPS 27 is active. An exemplary timing sequence that can successfully achieve one set of exemplary desired results are given below and in FIG. 9:

$\tau_1$-$\tau_0 \leq 50$ ms; 75 ms $\leq \tau_2$-$\tau_0 \leq 150$ ms; $\tau_4$-$\tau_3 \leq 75$ ms; 125 ms $\leq \tau_5$-$\tau_3 \leq 200$ ms.

Figure 10:
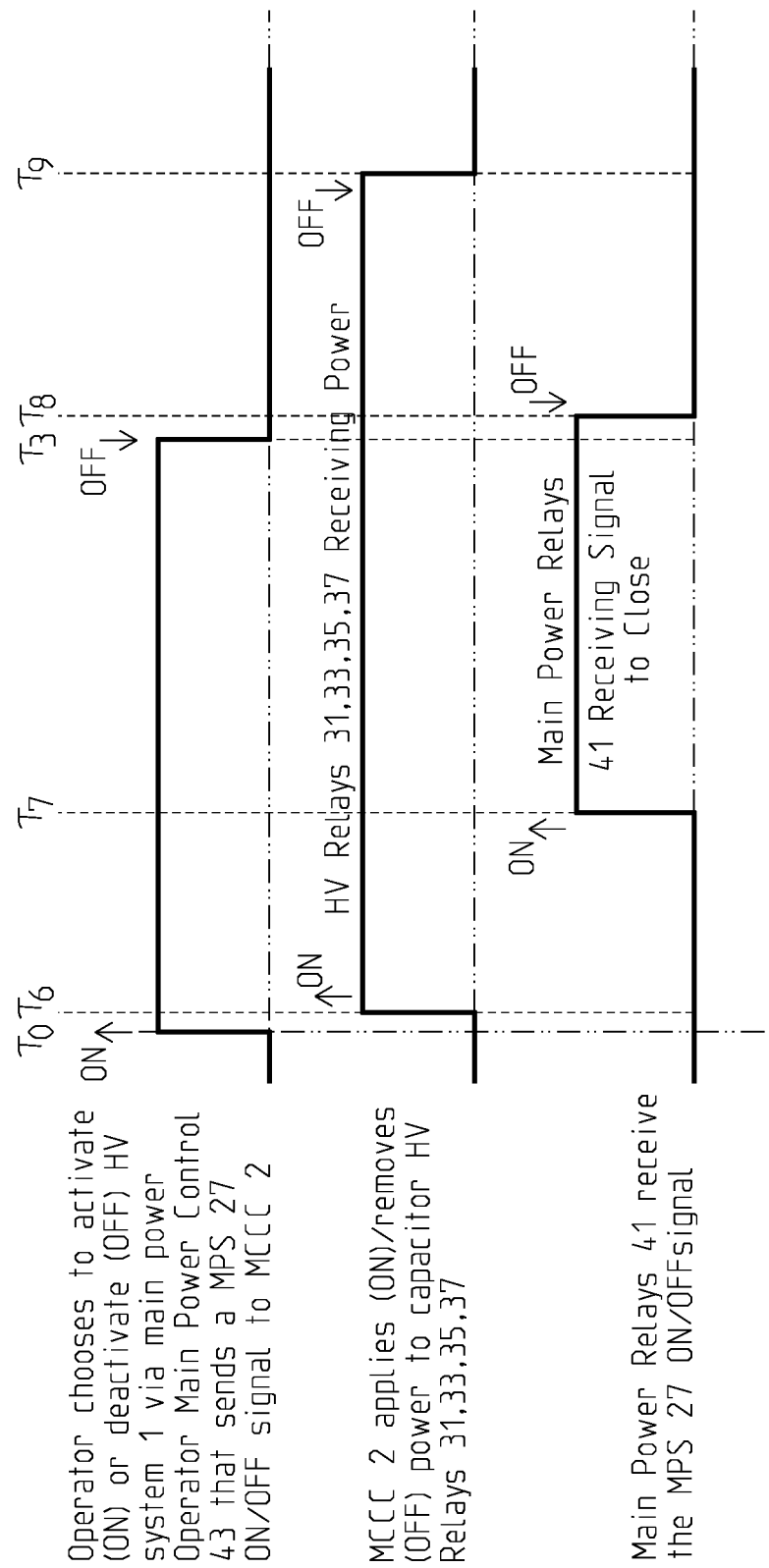
FIG. 10 shows an electrical signal timing sequence in accordance with one embodiment of the invention.

FIG. 10 shows one exemplary timing sequence of signals a MCCC 2 may output when the MCCC 2 receives a power-on input to activate the MPS 27 (e.g., where the power-on signal into E3 75 goes high) and when the MCCC 2 receives a power-off input to deactivate the MPS 27 (e.g., where the power-off signal into E3 75 goes low). When the power-on input into E3 75 goes high, $\tau_0$, the HV relays 31, 33, 35, 37 should receive power from the MCCC power supply 45 in a first predetermined amount of time $\tau_6$, e.g., 10 ms, and a power-on output to the main power relays 41 should be received within a second predetermined amount of time $\tau_7$, e.g., 75-100 ms, that is longer than the first predetermined amount of time. When the power-off input into E3 75 goes low, $\tau_3$, the power-off signal to the main power relays 41 should go low within a third predetermined amount of time $\tau_8$, e.g., 10 ms, and the power-off signal to the HV relays 31, 33, 35, 37 should go low within a fourth predetermined amount of time $\tau_9$, e.g., 125-160 ms, that is longer than the third predetermined amount of time. The power-off signal to the HV relays 31, 33, 35, 37 can represent removal of a power supply signal that actually deactivates the HV relays so they automatically close and shunt power from the HV capacitors. Alternatively, the power-on signal can be an actual power supply signal that operates the HV relays and opens them so the HV capacitors actually start charging upon MPS 27 activation.

Figure 11:
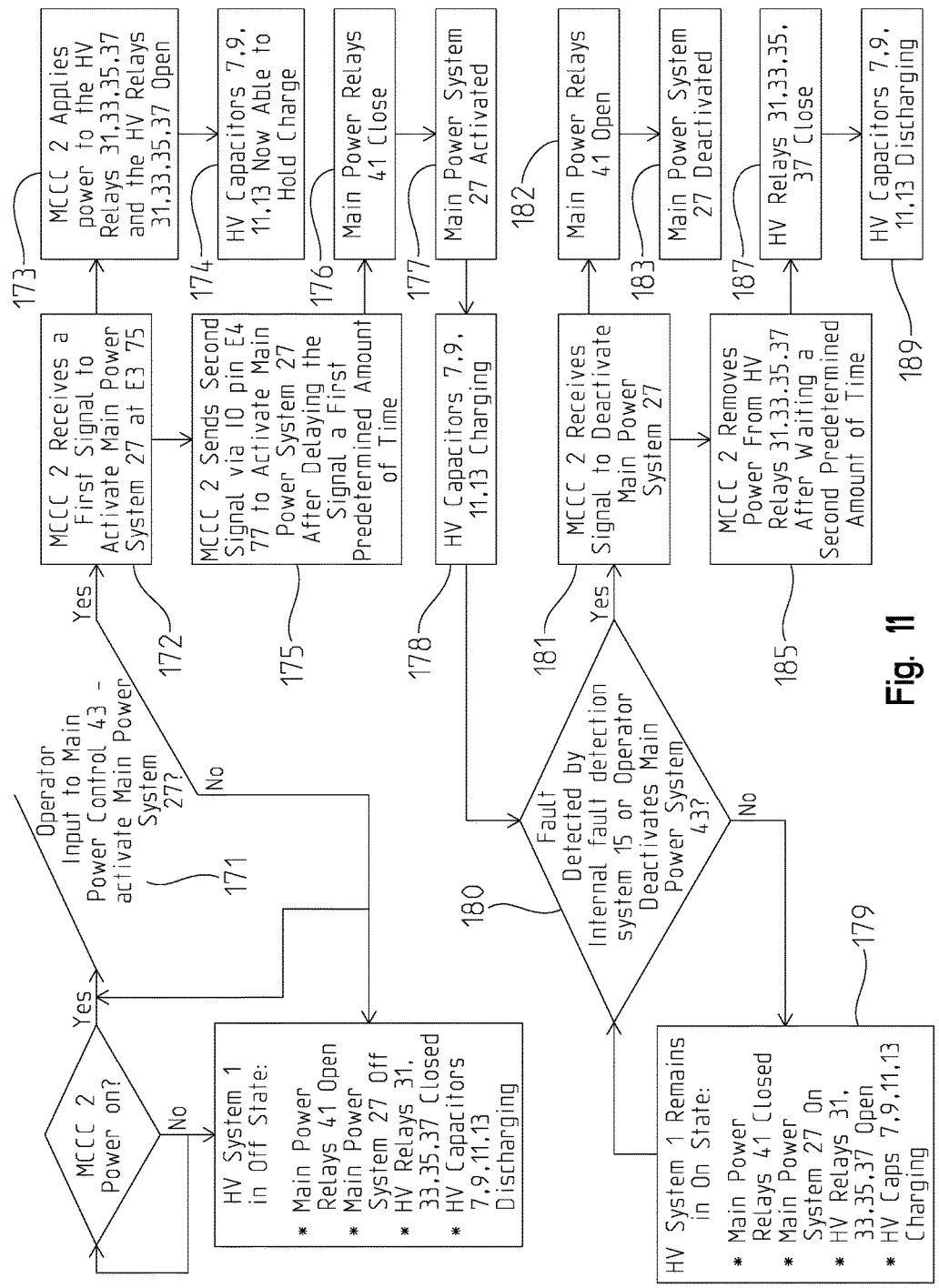
FIG. 11 shows a flowchart of a one method of operation of a high power system, e.g. radar system, and MCCC in accordance with one embodiment of the invention.

FIG. 11 shows an exemplary method of operating a MCCC 2. When the MCCC 2 is off, MPS 27 of HV system 1 should be in an off configuration, a set of HV relays 31, 33, 35, 37 should be closed, and HV capacitors 7, 9, 11, 13 should be shunted and discharged. Once the MCCC 2 is turned on (power applied to the MCCC 2 from the MCCC power supply 45, it waits for an operator main power control 43 input to activate the MPS 27, 171. When the MCCC 2 receives the power-on input to activate the MPS 27, 172, the MCCC first directs power from the MCCC power supply 45 to the HV relays 31, 33, 35, 37. The HV relays 31, 33, 35, 37 should immediately receive the power from the MCCC power supply 45 causing the HV relays 31, 33, 35, 37 to open 173. A time between the MCCC 2 receiving the power-on input and the HV relays 31, 33, 35, 37 receiving power can be designed to be less than 10 ms. Once the HV relays 31, 33, 35, 37 are opened, the HV capacitors 7, 9, 11, 13 should be able to hold a charge 174. Next, the power-on signal sent to the MPS 27 should be received after being delayed by the MCCC 2 for a first predetermined amount of time 175. After receiving the signal, the main power relays 41 of the MPS 27 should close 176 and the MPS 27 should then activate 177. At this point, the HV capacitors 7, 9, 11, 13 should be receiving power from the MPS 27, 178.

The MCCC 2 now waits for either a power-off fault signal from the fault detection system 15 or a power off signal from the operator main power control 43 to deactivate the MPS 180. If no power-off signal is received, then the HV system will remain in its current state 179 with the HV relays 31, 33, 35, 37 open, the HV capacitors 7, 9, 11, 13 holding charge, and the MPS 27 on. When a power-off signal to deactivate the MPS 27 is received 181, the MCCC 2 immediately sends a power-off signal to open the main power relays 41, 182 that will deactivate the MPS 27, 183. The MCCC 2 will also remove power from the MCCC power supply 45 that is being applied to the HV relays 31, 33, 35, 37 after waiting a second predetermined amount of time 185, e.g., 125-160 ms. Removing power from the HV relays 31, 33, 35, 37 will cause the HV relays 31, 33, 35, 37 to close 187 and the HV capacitors 7, 9, 11, 13 to discharge 189. At this point the MPS 27 is off, the HV relays 31, 33, 35, 37 are closed, the HV capacitors 7, 9, 11, 13 are discharging, and the MCCC 2 waits for operator main power control 43 to send a power-on signal to activate the MPS 2.

FIG. 12 shows a potential pin assignment for the external connector 121 that connects an exemplary MCCC 2 to the exemplary HV system 1 in accordance with one embodiment of the invention.

FIG. 13 shows how a set of IO pins J1 51, J2 53, J3 55, and J4 57 could connect to a respective HV relay 31, 33, 35, 37 and the purpose of each connection in accordance with one embodiment of the invention.

The invention has been described in detail with reference to certain preferred embodiments, variations and modifications exist within the spirit and scope of the invention as described and defined in the following claims.

The invention claimed is:

1. A power control system comprising:
a high voltage (HV) system comprising one or more HV capacitors, a HV main power system (MPS), and a first MPS user input section comprising a first user MPS input section and second user MPS input section, said first user MPS input section is configured to generate a MPS activation signal and said second user MPS input section is configured to generate a MPS deactivation signal, said MPS comprising a first power relay system configured to selectively supply power to said HV system and charge said one or more HV capacitors upon receiving a first relay activation signal; and
a HV capacitor discharge/charge control system (HVCDCCS) comprising a first and second section configured to send said first relay activation signal to said MPS;
wherein said HVCDCCS first section comprises one or more second relays comprising one or more HV capacitor shunt relays configured to selectively couple said one or more HV capacitors to a power dump circuit adapted to remove stored electrical energy from said one or more HV capacitors, wherein said one or more second relays are configured to couple said one or more HV capacitors to said power dump circuit until a second relay activation signal is received by each of said one or more second relays, wherein said one or more second relays decouple said one or more HV capacitors from said power dump circuit upon receiving said second relay activation signal;
wherein said HVCDCCS second section comprises a crowbar control circuit (CCC) section comprising a timing control section configured to control said first power relay system in a first CCC operation and a second CCC operation, wherein said first CCC operation is based on a first CCC timing control sequence logic and said second CCC operation is based on a second CCC timing control sequence logic;
wherein said CCC is configured to execute said first CCC operation upon receiving said MPS activation signal that triggers said timing control section to output said second relay activation signal to said one or more second relays within a first time period then said timing control section outputs said first relay activation signal to said first power relay system after said first time period;
wherein said CCC is configured to execute said second CCC operation upon receiving said MPS deactivation signal that triggers said timing control section to output a first relay deactivation signal to said first power relay system in a second time period then said timing control section outputs a second relay deactivation signal after said second time period.

2. The system as in claim 1, wherein said power dump circuit comprises a high resistance resistor coupled to a ground.

3. The system as in claim 1, wherein said first and one or more second relays are mechanical relays.

4. The system as in claim 1, further comprising a fault detection system configured to detect predetermined electrical faults in said HV system and output a fault detection system output into said CCC, wherein said CCC is configured to execute said second CCC operation to shut down said MPS in response to the fault detection system output.

5. The system as in claim 1, further comprising a fault detection system configured to detect a predetermined fault in a CCC power supply and output a fault detection system output into said CCC, wherein said CCC is configured to execute said second CCC operation after receiving said fault detection system output.

6. The system as in claim 5, wherein said HV system comprises a HV radar system, wherein said one or more HV capacitors comprises a plurality of HV capacitors comprising a first, second, third, and fourth HV capacitor held within a plurality of cabinets, wherein each said plurality of cabinets each comprise door switches coupled with said fault detection system.

7. The system as in claim 1, wherein said CCC receives a power input from a CCC power supply section in said MPS.

8. The system as in claim 7, further comprising:
a fault detection system configured to detect a predetermined fault in a CCC power supply and output a fault detection system output into said CCC, wherein said CCC is configured to execute said second CCC operation after receiving said fault detection system output;
wherein said power dump circuit comprises a plurality of HV resistors coupled to a ground;
wherein said CCC further comprises:
a first plurality of input/output (TO) interfaces comprising a first, second, third, and fourth IO element, wherein said first and second IO elements are coupled with said CCC power supply section in said MPS configured to supply power to components within said CCC, said third IO element is coupled with said first MSP user input section and to said fault detection system, and said fourth IO element is coupled to said first power relay system;
a power bus comprising a plurality of power bus lines configured to distribute power received from said first and second IO elements to a plurality of components within said CCC;
a first diode coupled with said first IO element to prevent a reverse application of power within the system and a reverse application of power to said CCC power supply;
a capacitor configured to store a first charge to provide a power backup for said CCC coupled to said power bus, wherein said capacitor is coupled with said first diode and said second IO element;
a voltage regulator configured to modify an incoming voltage from said CCC power supply to a second voltage, wherein said voltage regulator is coupled with said first diode and said capacitor;
a first and second delay circuit configured to receive said first MPS user input and said second user MPS input and output a first and second delayed signal, wherein said first delay circuit is coupled with said voltage regulator and with said third IO element, and said second delay circuit is coupled with said voltage regulator and with said first delay circuit;
a second diode coupled with said third IO element and configured to prevent the reverse application of said second outgoing signal from said second delay circuit from being applied to said first delay circuit;
a first and second MOSFET integrated circuit (IC), wherein said first MOSFET is coupled with said third IO element and with said fourth IO element, and said second MOSFET is coupled with said third IO element;
a first and second NPN transistor, wherein said first NPN transistor is coupled with said first MOSFET, said first delay circuit, and said second IO element, said first NPN transistor is configured to operate as a switch for said first MOSFET, said second NPN transistor is coupled with said second MOSFET, with said second delay circuit, said second diode, and said second IO element, said second NPN transistor is configured to operate as a switch for said second MOSFET; and a second plurality of IO interfaces comprising a fifth, sixth, seventh, and eighth IO element, wherein said second plurality of IO interfaces is coupled with said second MOSFET;

wherein said one or more second relays comprise a first, second, third, and fourth HV relay, wherein said first HV relay is coupled with said fifth IO element, said second HV relay is coupled with said sixth IO element, said third HV relay is coupled with said seventh IO element, and said eighth IO element is coupled with said fourth HV relay;

wherein said plurality of HV resistors comprises a plurality of bleeder resistors comprising a first, second, third, and fourth bleeder resistor, wherein said first bleeder resistor is coupled with said first HV relay and a first HV capacitor, said second bleeder resistor is coupled with said second HV relay and a second HV capacitor, said third bleeder resistor is coupled with said third HV relay and a third HV, and said fourth bleeder resistor is coupled with said fourth HV relay and a fourth HV capacitor.

9. A method for operating a power controls system comprising: providing said power control system comprising:

a high voltage (HV) system comprising one or more HV capacitors, a HV main power system (MPS), and a first MPS user input section comprising a first user MPS input section and second user MPS input section, said first user MPS input section is configured to generate a MPS activation signal and said second user MPS input section is configured to generate a MPS deactivation signal, said MPS comprising a first power relay system configured to selectively supply power to said HV system and charge said one or more HV capacitors upon receiving a first relay activation signal; and a HV capacitor discharge/charge control system (HVCDCCS) comprising a first and second section configured to send said first relay activation signal to said MPS;

wherein said HVCDCCS first section comprises one or more second relays comprising one or more HV capacitor shunt relays configured to selectively couple said one or more HV capacitors to a power dump circuit adapted to remove stored electrical energy from said one or more HV capacitors, wherein said one or more second relays are configured to couple said one or more HV capacitors to said power dump circuit until a second relay activation signal is received by each of said one or more second relays, wherein said one or more second relays decouple said one or more HV capacitors from said power dump circuit upon receiving said second relay activation signal;

wherein said HVCDCCS second section comprises a crowbar control circuit (CCC) section comprising a timing control section configured to control said first and one or more second power relay systems in a first CCC operation and a second CCC operation, wherein said first CCC operation is based on a first CCC timing control sequence logic and second CCC operation is based on a second CCC timing control sequence logic;

wherein said CCC is configured to execute said first CCC operation upon receiving said MPS activation signal that triggers said timing control section to output said second relay activation signal to said one or more second relays within a first time period then said timing control section outputs said first relay activation signal to said first power relay system after said first time period;

wherein said CCC is configured to execute said second CCC operation upon receiving said MPS deactivation signal input that triggers said timing control section to output a first relay deactivation signal to said first power relay system in a second time period then said timing control section outputs a second relay deactivation signal after said second time period;

operating said first MPS user input section to send said MPS activation signal, said CCC intercepts said MPS activation signal;

commencing said first time period upon receiving said MPS activation signal;

outputting said second relay activation signal to said one or more second relays from said CCC within said first time period;

opening said one or more second relays upon receiving said second relay activation signal; outputting said first relay activation signal to said first power relay system from said CCC after said first time period has elapsed;

closing said first power relay system upon receiving said first relay activation signal; activating said MPS upon closing said first power relay system;

charging said one or more HV capacitors upon activating said MPS;

operating said second MPS user input system to send said MPS deactivation signal, said CCC receives said MPS deactivation signal;

commencing said second time period upon intercepting said MPS deactivation signal;

outputting said first relay deactivation signal to said first power relay system from said CCC within said second time period;

opening said first power relay system upon receiving said first relay deactivation signal;

deactivating said MPS upon opening said first power relay system;

outputting said second relay deactivation signal to said one or more second relays from said CCC after said second time period has elapsed;

closing said second relays upon receiving said second relay deactivation signal; and discharging said one or more HV capacitors upon closing said second relays.

10. The method for operating said power control system as in claim 9, further comprising providing a fault detection system configured with control logic to detect at least one predetermined fault condition comprising an open HV cabinet associated with said HV system or a circuit breaker operation associated with said HV system, wherein said HV cabinets comprise a plurality of door switches configured to detect said open HV cabinet, wherein said MPS comprises a CCC power supply and a spark gap section, wherein said fault detection system is connected to a circuit breaker, said door switches, said CCC power supply, and to said spark gap section;

matching stored fault parameters with inputs from at least said power control system or said HV system and generating said MPS deactivation signal based on matching inputs from said power controls system, said HV system or said MPS system with said stored fault parameters;

wherein said fault conditions comprise a first fault condition comprising when said circuit breaker is tripped and generates a first fault signal, a second fault condition comprising when one or more said door switches generate a second fault signal when said HV cabinets are opened, a third fault condition comprising a condition when said CCC power supply generates a third fault signal when said CCC power supply malfunctions, and a fourth fault condition when said spark gap section generates a fourth fault signal when a voltage in the MPS is above a predetermined threshold.

11. The method for operating the power control system as in claim 9, wherein said first time period is 10 ms;

wherein said first relay activation signal is sent to said first power relay system 65-90 ms after said first time period ends;

wherein said second time period is 10 ms; and wherein said second relay deactivation signal is sent to said one or more second relays 115-150 ms after said second time period ends.

* * * * *